Nov. 27, 1928.
C. I. SIEGEL
1,692,999
DISPLAY FRAME
Filed Dec. 6, 1927
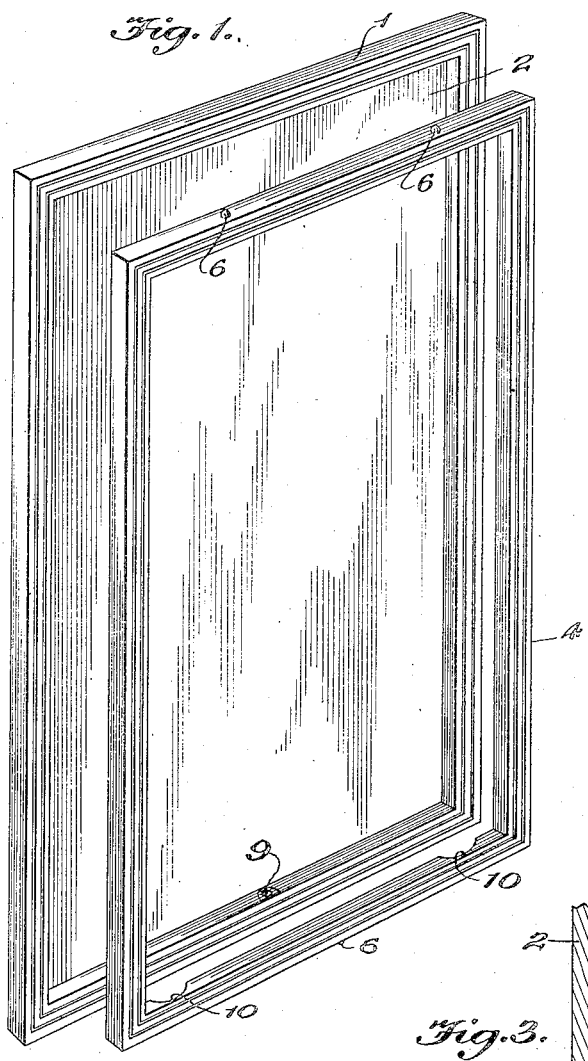
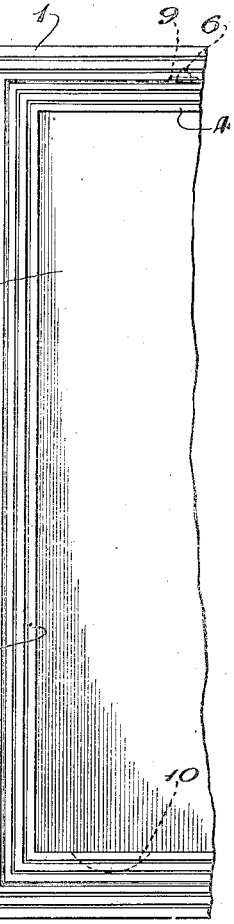
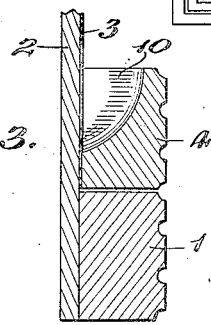
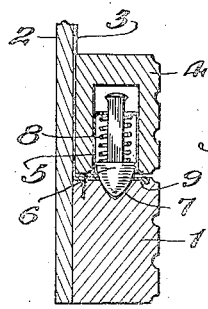
Inventor
Clarence I. Siegel.
By William C. Linton
Attorney Patented Nov. 27, 1928.

1,692,999

UNITED STATES PATENT OFFICE.

CLARENCE I. SIEGEL, OF CHICAGO, ILLINOIS.

DISPLAY FRAME.

Application filed December 6, 1927. Serial No. 238,161.

This invention relates to improvements in poster display frames, having for an object to provide a frame of the character indicated wherein a retaining and locking frame are included, the several frames being of complemental shape and the one snugly receivable or fitable into the other whereby to engage the outer portions of a poster or advertising sheet that the same will be securely and smoothly retained within the retaining frame.

It is also an object of the invention to provide a poster display frame wherein means are arranged upon the locking frame and are adapted to be engaged in receiving means in adjacent portions of the retaining frame in order that the locking frame may be removably or releasably engaged in and connected to said retaining frame, the arrangement of said connecting means being such that interconnection between the two frames will be effected at relatively spaced points along their adjacent or contacting end portions in a manner which will permit of a fulcruming like engagement and connection of the locking frame within the retaining frame, hence, allowing of quick yet efficient engagement or disengagement of said locking frame into and from the retaining frame.

Other objects of the invention will be in part obvious and in part pointed out hereinafter.

In order that the invention may be readily understood by those skilled in the art to which it appertains, I have in the accompanying illustrative drawings and in the detailed following description based thereupon, set out one possible embodiment of my invention.

In these drawings:

Figure 1 is a perspective view of my improved display frame showing the locking frame removed from the retaining frame.

Figure 2 is a detailed front elevation of the display frame when assembled.

Figure 3 is a detailed vertical sectional view through the lower portion of the display frame when assembled to illustrate more in detail one of the finger engaging pockets, and Figure 4 is a similar view to illustrate in detail one of the snap fasteners employed to detachably retain the locking frame within the retaining frame.

Having more particular reference to the drawings, in connection with which like characters of reference will designate corresponding parts throughout, the improved display device may be stated to comprise, in this particular embodiment a substantially rectangularly shaped retaining frame 1 having a backing or panel portion 2 secured to the rearward side thereof, said panel being formed of light stable material, such as fiber board, composition board or the like, thus forming a body for receiving and smoothly retaining a poster or advertising sheet thereupon, the latter, as will be noted, being of a size such as will permit of its snug reception within the rectangularly shaped retaining frame 1.

With arrangement of the poster or advertising sheet 3 within the retaining frame 1 and upon the panel or backing portion 2 thereof, it becomes desirable that means shall be provided for engaging and locking the poster in its smoothed displaying position in the retaining frame and to accomplish this, I provide the device with what I term as a locking frame indicated by the numeral 4, said locking frame being formed of material corresponding to that from which the retaining frame is constructed and being of a shape complemental to the shape of said retaining frame but of a size such as will permit of its snug reception or interfitting within the retaining frame whereby it will be arranged parallel to and in juxtaposed relation with respect to the inner marginal portions of the retaining frame as is shown in the Figure 1. Thus, it will be seen that with the snug interfitting of the rectangularly shaped locking frame 4 within the similarly shaped retaining frame 1, portions of the locking frame will be flushly engaged throughout their respective area with adjacent portions of the poster or advertising sheet 3 and therefore, will serve as a means for clampingly retaining said poster or advertising sheet in its smooth displaying position upon the backing or panel 2 and within the retaining frame 1.

That the locking frame 4 may be releasably connected to the retaining frame 1 whereby to avoid undesirable or accidental displacement thereof, cup like retaining shells 5 are embedded in the outer side of one end of the locking frame 4 in relatively spaced relation and at points in proximity to the opposite side portions of the same. In these cup like shells 5 spring pressed plungers 6 having rounded outer extremities are arranged, suitable spring devices 8 being interposed between portions of said plungers 6 and the inner ends of their respective shell like cups 5 as is shown in Figure 4 so that the rounded outer extremities 7 of the plunger will be normally retained in distended positions with respect to that side or marginal portion of the end of the locking frame carrying them. These rounded outer extremities 7 of the spring pressed plungers 6 are adapted to be yieldably and removably engaged in the openings of brackets 9 inset in adjacent portions of the inner side or face of the corresponding end portion of the retaining frame 1 and because of this, it will be understood that a removable connection as between these particularly adjacent ends of the retaining and the locking frames 1 and 4 will be effected.

To releasably secure the remaining or opposite end of the locking frame to the corresponding end of the retaining frame 1, a corresponding type of shell like cup 5 receiving the spring pressed plunger 6 with a rounded outer extremity 7, is embedded or arranged in the said opposite end of the locking frame adjacent the outer marginal portion or face thereof; the arrangement of this latter mentioned spring pressed plunger 6 being intermediately of the corresponding devices secured or arranged in the opposite end of the locking frame. A bracket 9 is flushly inset with respect to the inner marginal portion or face of the correspondingly arranged remaining end of the retaining frame 1 and is so positioned that with reception of the locking frame 4 within the retaining frame 1, a yieldable and removable connection will be established therewith.

To facilitate disengagement or removal of the locking frame 4 from the retaining frame 1, finger engaging portions or pockets 10 are formed in the inner side portion of that end of the locking frame 4 carrying the single spring pressed plunger 6 in the cup-like shell 5, the arrangement of these finger receiving pockets being upon either side of the spring pressed plunger 6 and in proximity to the opposite side portions of the same; also, at points upon said end portion of the frame outwardly of or beyond the positioning of the spring pressed plungers 8 mounted or arranged in the opposite end portion of said locking frame 4. By this arrangement of finger engaging pockets 10, in that end portion of the locking frame 4 carrying the single intermediately disposed spring pressed plunger 6, it will be seen that with engagement of a locking frame 4 within the retaining frame 1, disengagement of the locking frame from the retaining frame may be readily effected should a person engage his fingers in the several pockets 10 and impart an outward pull or thrust to the same, such action causing that end of the locking frame having the pockets therein to be swung outwardly from the adjacent end of the retaining frame 1, thereby causing said locking frame to fulcrum from its opposite or remaining end which is removably connected to the corresponding end of the retaining frame 1 through the relatively spaced spring pressed plungers 6 engaging in their respective brackets 9. With this outward swinging of one end portion of the locking frame 4, said frame may be then readily removed from the retaining frame 1 by pulling or moving it in a direction to disengage the two spring pressed plungers 6 from their particular brackets 9 in the adjacent end of the retaining frame 1.

When it is desired to reengage the locking frame 4 within the retaining frame 1, that end portion of the locking frame carrying the two or plurality of spring pressed plungers 6 is inserted within the retaining frame 1 and is moved in a direction whereby to effect engagement of the plungers in the particular brackets 9 provided therefor in the adjacent end of the retaining frame 1. At this time, the opposite end of the locking frame 4 is forced inwardly, causing the intermediately positioned spring pressed plunger 6 carried thereby to be forced inwardly until the frame is completely within the retaining frame 1 whereupon previously depressed plunger 6 will be moved to its extended position and in engagement with the bracket 9 provided therefor in the corresponding end of the retaining frame 1. Consequently upon this, it will be seen that the locking frame 1 will be positively yet releasably secured or connected within and to the retaining frame 1 and by this, the inner face portion of the locking frame 4 will be retained in positive clamping like engagement with the adjacent outer portions of a poster or advertising sheet 3 within the retaining frame 1 and upon the panel or backing portion 2 thereof.

Also, it will be understood that whereas I have in this particular embodiment of the invention disclosed retaining and locking frames of substantially rectangular shape, these shapes may be varied to other multi-sided designs in which case the arrangement of the spring pressed plunger devices and their respective brackets 9 would correspond to the arrangement set forth and described in the present embodiment of the invention.

Manifestly, the construction shown is capable of considerable modification and such modification as is within the spirit of my claims, I consider within the scope of my invention.

I claim:

1. A poster display device comprising a retaining frame, a backing extending over said frame forming a poster receiving pocket therein, a complementary shaped locking frame snugly receivable within the poster receiving pocket of the retaining frame for holding the poster therein, snap fasteners at spaced points along one side of said frame for establishing a connection therebetween, a snap fastener at one point intermediate of said spaced snap fasteners along the opposite side of said frame for establishing another connection therebetween, finger engaging pockets formed in that side of said retaining frame having a single snap fastener adapted to have locking engagement with the retaining frame for facilitating the disengagement and removal of the locking frame from the poster receiving pocket thereof, and said snap fasteners being hidden from view when said locking frame is secured within the retaining frame.

2. A poster display device comprising a substantially rectangularly shaped retaining frame consisting of side and end pieces, a backing extending over said frame forming a poster receiving pocket therein between said side and end pieces, a complementary shaped locking frame snugly receivable within the poster receiving pocket of said retaining frame for holding the posters therein, brackets secured to the inner face of the end members of said retaining frame, spring pressed plungers mounted within the opposite ends of said locking frame and adapted to engage the brackets carried by said retaining frame for establishing a removably engageable connection between the locking frame and said retaining frame, said plungers being hidden from view when said locking frame is retained within the retaining frame and said retaining frame being removable from said locking frame by pulling laterally thereupon whereby said spring pressed plungers will be caused to be forced from disengagement with the brackets carried by the retaining frame.

In witness whereof I have hereunto set my hand.

CLARENCE I. SIEGEL.